(12) United States Patent
Donhauser et al.

(10) Patent No.: US 6,880,106 B2
(45) Date of Patent: Apr. 12, 2005

(54) AUTOMATION SYSTEM AND METHOD FOR OPERATING AN AUTOMATION SYSTEM

(75) Inventors: Richard Donhauser, Poppenricht (DE); Pirmin Lind, Birkenhoerdt (DE); Thilo Opaterny, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 681 days.

(21) Appl. No.: 09/818,572

(22) Filed: Mar. 28, 2001

(65) Prior Publication Data

US 2001/0052088 A1 Dec. 13, 2001

Related U.S. Application Data

(63) Continuation of application No. PCT/EP99/06902, filed on Sep. 15, 1999.

(30) Foreign Application Priority Data

Sep. 28, 1998 (DE) .......................................... 981 18 288

(51) Int. Cl.$^7$ ............................................... G06F 11/00
(52) U.S. Cl. .............................. 714/35; 714/38; 700/26
(58) Field of Search .............................. 714/33, 35, 38; 712/244; 700/23, 26

(56) References Cited

U.S. PATENT DOCUMENTS

| | | | | |
|---|---|---|---|---|
| 5,008,842 A | * | 4/1991 | Nagai et al. ................. | 702/183 |
| 5,321,828 A | * | 6/1994 | Phillips et al. ................ | 703/28 |
| 5,469,563 A | | 11/1995 | Morita | |
| 5,754,839 A | * | 5/1998 | Pardo et al. ................. | 712/227 |
| 5,870,607 A | * | 2/1999 | Netzer ......................... | 717/127 |
| 6,163,805 A | * | 12/2000 | Silva et al. .................. | 709/227 |
| 6,249,882 B1 | * | 6/2001 | Testardi ....................... | 714/38 |
| 6,263,457 B1 | * | 7/2001 | Anderson et al. ............. | 714/38 |
| 6,675,192 B2 | * | 1/2004 | Emer et al. .................. | 718/107 |

FOREIGN PATENT DOCUMENTS

| | | |
|---|---|---|
| DE | 38 08 135 A1 | 9/1989 |
| EP | 0 114 073 B1 | 7/1984 |
| EP | 0 450 116 A1 | 10/1991 |
| WO | WO 95/27236 | 10/1995 |

* cited by examiner

*Primary Examiner*—Scott Baderman
*Assistant Examiner*—Joshua Lohn
(74) *Attorney, Agent, or Firm*—Sughrue Mion, PLLC (57) ABSTRACT

An automation system, and method for operating an automation system, comprising at least one automation device and one programming device connected therewith, or each containing a communications program, so that they can communicate with one another. The automation device executes an application program, particularly a program to control and/or monitor an external technical process, and the programming device monitors the execution of the application program in that one or a plurality of data addresses (1132, 1133) of the application program is selected for monitoring on the programming device. For each data address (1132, 1133) selected for monitoring, a code address (1131), that is, an address of the application program, particularly an address in the immediate proximity of a segment of the application program that influences the content of the selected data address, is selected on the programming device, and the selected data address (1132, 1133) together with the code address (1131) is transmitted to the automation device as part of a request message (AT). The present invention records the content of the selected data address (1132, 1133) during execution of the application program when the corresponding code address (1131) is reached, and the recorded content of the data address is transmitted to the programming device as part of a result message (ET).

35 Claims, 3 Drawing Sheets

Figure 3. Automation System

AUTOMATION SYSTEM AND METHOD FOR OPERATING AN AUTOMATION SYSTEM

This is a Continuation of International Application PCT/EP99/06902, with an international filing date of Sep. 15, 1999, which was published under PCT Article 21(2) in German, and the disclosure of which is incorporated into this application by reference.

FIELD OF AND BACKGROUND OF THE INVENTION

To start-up and service an automation device, monitoring of the software running on the automation device is provided. It is desirable that said monitoring does not noticeably interfere with, or even interrupt execution of the software.

OBJECTS OF THE INVENTION

Thus, an object of the present invention is to provide an automation system, and a method for operating the automation system, in which an automation device can be monitored by a programming device such that interference is avoided to the greatest possible extent.

SUMMARY OF THE INVENTION

This and other objects of the invention are attained by an automation system, and method for operating the automation system, that comprises at least one automation device and one programming device connected to the automation device, enabling the two devices to communicate with one another. The automation device executes an application program, in particular, a program to control and/or monitor an external technical process. The programming device monitors the execution of the application program in that one or a plurality of data addresses of the application program are selected for monitoring on the programming device. For each data address selected for monitoring, a code address (an address of the application program, particularly an address in the immediate proximity of a segment of the application program that influences the content of the selected data address) is selected on the programming device. The selected data address together with the code address is then transmitted to the automation device as part of a request message. Subsequently, the content of the selected data address is recorded when the corresponding code address is reached during execution of the application program, and the recorded content of the data address is transmitted to the programming device as part of a result message.

All of the memory areas existing in the automation device can be referenced via a data address. Accordingly, the term data address in the present context does not only denote an explicit address in the area of the application program, but can also denote a data area defined by a start address and an end address and, in addition, individual registers or register sets.

In a preferred embodiment, the software in the automation device is divided into firmware and the application program, and the application program is divided into modules which are essentially independent from one another and will be referred to as modules hereinafter. The modules are generated on the programming device and are loaded into the automation device, where they are executed under the control of the firmware of the automation device. Each automation device and programming device can include a computer readable medium, on which is stored a computer program for operating and monitoring the automation system.

In automation tasks, processing is typically cyclical. For example, a few modules that are continuously restarted in a fixed time pattern. Some special modules are also restarted immediately after execution. This is termed a free cycle, i.e., a cycle that is not based on a fixed time pattern.

If the automation device has several processors, several modules can be executed simultaneously. If only one processor is available, however, the corresponding modules are executed in a time-sharing operation, which gives the user the impression that the corresponding modules are processed simultaneously.

The modules are created by the user in languages provided for this purpose (possibly several different languages) and are translated into the machine language of the automation device by a translation program executable on the programming device. In an exemplary embodiment, the programming languages KOP, FUP, AWL, SCL, HIGRAPH, GRAPH 7, etc. are used.

The automation device successively executes the individual machine instructions of a module. To this end, each individual machine instruction of the automation device can be uniquely referenced by a code address. This code address is specified by the module, the module type and number, and the individual machine instruction, which is represented in the module by its corresponding address. The aforementioned request message comprises one or several of said code addresses.

To select a data address or a data address area, a certain instruction of the application program or a section with several program instructions is flagged and then the flag is interpreted as a selection. Alternatively, this selection can of course also be made by explicit data, for example by manually entering the relevant data addresses.

In an automation device, data that is supplied by, for example, sensors is processed and actuators are initiated based on the processing results. There are different constructs for this purpose depending on the language used. They all have in common that they are capable of differentiating between various data areas, which they address in their instructions. In all languages, it is possible to poll an individual sensor, address an individual actuator, and temporarily store the results, e.g., to retain states across module boundaries. Depending on the machine proximity of the correspondingly used language, the language scope also supports a direct manipulation of registers. The smallest unit thus addressable is a data address.

To monitor the automation device, the programming device sends a job to the automation device by means of a request message. This request message comprises one or several code addresses corresponding to one or several data addresses per code address.

The request message has a header segment, an entry data set segment, and one or several watch point segments, each of said watch point segments having at least one code address and one or several data addresses. The data addresses can address all memory areas existing in the machine model, including the registers, but particularly bit groups, since many sensors and actuators supply not only individual bits but also groups of bits. For this reason, larger connected areas may also be addressed with a data address.

When reaching one of the code addresses specified in the request message, the automation device records the data indicated in the same watch point segment together with this code address. In addition, a trigger condition may be defined, which must be met when reaching a code address, so that recording will start. The automation device in turn transmits the requested data to the programming device after each cycle, regulated by flow control, until the job is stopped or cancelled by other request messages.

The structure and form of the result message are entirely analogous to that of the request message. The result message also has a header segment, an entry data set segment, and one or several watch point segments, each of said watch point segments having at least one code address and one or several data addresses.

The constructs available in the so-called higher programming languages are mapped to the instructions of the target machine. In some situations, certain data may be available in the corresponding registers of the automation device only temporarily without ever being stored under a data address that can be referenced by the user. To enable monitoring of such interim results on the side of the programming devices, the request message of the present invention can indicate registers to a code address. As an example is a simple logic function in the form of "IF sensor 1 AND sensor 2 OR sensor 3, THEN actuator 1." The result of the AND operation is intermediately stored in a register so that this intermediate result can be used in the subsequent OR operation. The ultimate result of the logic operation is then again directly available at a data address as the content of the variable actuator 1. The intermediate result, however, would be lost if access to the register itself were not also possible. At this point it is also readily evident why code addresses are utilized in the present invention in the request message as well as data addresses for each of these code addresses.

Since it is perfectly possible in modules that a data address is written and read several times, it is advantageous to monitor the data not at the end of the cycle, but at all the code addresses at which it is referenced. This makes it possible to reconstruct the application program on the side of the programming device.

Particularly in the case described above, it is not sufficient, for instance, to indicate the register in which the intermediate result of the aforementioned AND operation is buffered, since this register may be used to store a wide variety of intermediate results at various instants. Only immediately after the logic function "IF sensor 1 AND sensor 2," the content of the register reflects the result of the AND operation. That is, the result of the subsequent OR operation is buffered in the same register, so that the result of the AND operation is lost.

In operation, the automation device records the data specified in the request message in order to send it to a programming device subsequent to recording. Generally, the automation device can record only a comparatively small amount of data. In particular, the amount of data to be recorded is defined on the one hand by the type and speed of the automation device, and on the other hand by the communication means between the automation device and the programming device as well as by the interference tolerated by the user in program execution on the side of the automation device. The amount of transferable data defines an upper limit for the amount of recordable data, even if the automation device could theoretically record a larger amount of data. It is therefore preferable to use the request message only to request information that can subsequently also be displayed on the programming device.

Higher special purpose languages for sequencers (e.g., HIGRAPH, GRAPH 7, etc.) in turn use basic languages (e.g., AWL, KOP, FUP, etc.) to program the step enabling condition and the action to be performed in the corresponding step. For the user, it is important on the one hand to detect which step is currently active and, in addition, especially to look at the step enabling condition. For this purpose, it is generally sufficient to look at a few code addresses. The number of the relevant code addresses is relatively low compared to the size of the module. However, the relevant code addresses are usually scattered within the module and furthermore mixed in with the runtime system of the sequencer control. Based on the limited possibilities regarding data transfer between the automation device and the programming device, it would not make sense to monitor the entire module, since this might very quickly conflict with the upper limits of the data transfer capacity. In effect, of course, only the code addresses necessary to calculate the step enabling conditions are required. Consequently, only the actually required code addresses are transferred to the programming device in the present automation system.

A similar problem results in the programming of module calls with parameters. In the individual case, a plurality of individual instructions is required to transfer the parameter values. Consequently, only a few code addresses, which are distributed over a large area of the module, would actually be relevant for monitoring. In such a case, it is provided to accept the values to be transferred to the module from the so-called stack. The filing of parameters on a stack when subroutines are called is one method for transferring parameters from a first program area to a second independent program area. It is apparent, therefore, that all values that are transferred into a module can be read from the stack, or even from a special instance data module, prior to the actual machine instruction to call the module. Analogously, all values that are transferred from the module can be read from the stack, or again from the instance data module, after the actual machine instruction to call the module. To monitor parameter transfer, two code addresses are required for each module call. In the individual case, however, several data addresses may be required per code address. The number of required data addresses depends on the number of input and output parameters.

Data flow control, also referred to as flow control in another context, is implemented in the following manner. After executing the modules associated with a cycle, the job initiated by the request message is blocked. This means that no further data is recorded, even if the automation device executes an instruction one additional time at a code address specified by the request message. At this time, the transmission of the requested data is triggered. This transmission takes place in parallel to the execution of the application program. Such a transmission process can extend over several cycles, if necessary, in which case the recorded data is transmitted in sections. During transmission, the application program is only imperceptibly interfered with due to the sectional transmission in parallel to the execution of the application program and particularly, also due to the possible distribution of the data to be transmitted over several cycles. Only after the programming device has evaluated and has displayed the data thus received, does it send a message to release the previously blocked job, so that recording of the data specified by the request message can restart.

In the programming device, the application programs are translated into machine instructions of the automation device by means of specially provided software. These can be instructions that are directly executable by the processor of the automation device or an intermediate language that is first interpreted in the automation system or translated into instructions of the processor of the automation system by the firmware of the automation system. In principle, however, the emphasis in translation is on short and quickly executable code.

In an automation device using a commercially available processor or processors in the form of microcontrollers, the machine model of the automation device must be transferred to the memory model of the microcontroller. For monitoring, additional code must be inserted into the translated application program. This generally requires a special translation run. If translation takes place in the firmware of the automation device, translation and the sequencing-in of the resulting additional instructions burdens the cycle time. If translation takes place in the programming device on the other hand, the cycle time is burdened by downloading and sequencing-in of the additional instructions. In either case, the present invention allows for the burden on the cycle time to be minimized by appropriately selecting the code addresses to be monitored.

To prevent burdening of the cycle time when a monitoring job is blocked, the instructions required for monitoring can be masked. The requested data is thus recorded only if the corresponding instructions are not masked. After completion of the cycle, the job can be blocked by the firmware unless this already occurs during recording. Finally, the recorded data is sent to the programming device.

In an automation device that interprets the machine instructions, the interpreter causes the machine model to be mapped to the real memory. For the following examination it is unimportant whether the interpreter is realized by an application specific integrated circuit (ASIC) or by a program on a commercially available microcontroller. The firmware flags the instructions to be monitored, for which it requires at least 1 bit per instruction. When the interpreter meets a flagged instruction, it interrupts execution and records the requested data. Subsequently, execution is continued. As in translating machines, this interruption must be maskable to prevent burdening the cycle time whenever the job is blocked. Analogous to translating machines, the job can be blocked by the firmware after completion of the cycle, unless this already occurs during recording. Finally, the recorded data is sent to the programming device.

According to a further embodiment of the present invention, a monitoring job is provided with conditions to ensure that in modules, which are multiply executed in a cycle, a special execution can be monitored. Furthermore, it is possible to distinguish in a job what the response is to be in case of multiple execution of the instructions within a module. Such multiple execution occurs in the module if loops are created by jumps within the module. In the monitoring job, it may be specified, for example, whether or not the job is blocked by multiple execution. If it is not blocked in the second execution of a code address, the data for this code address is overwritten so that, as a result, the data of the last looping is available for actual transfer to the programming device. If, in contrast, a transfer were to occur with each looping, a high burden would be placed on the cycle time. The burden on the cycle time can be further reduced in that recording is blocked when multiple execution first occurs, so that only the data of the first looping is transferred.

The present invention also allows for a specification to contain several code addresses for each module and several data addresses for each code address. The code address defines an individual machine instruction. The data addresses can be used to address all memory areas present in the machine model, including the registers. This method minimizes the data to be recorded and transferred as well as the burden on the cycle time associated with said recording and transfer. Said minimization is independent of the language in which the application program was created and the type of the target machine.

BRIEF DESCRIPTION OF THE DRAWINGS

The invention is explained in more detail below with the aid of diagrammatic, exemplary embodiments in the drawing, in which.

DETAILED DESCRIPTION OF THE PREFERRED EMBODIMENTS

Figure 1:
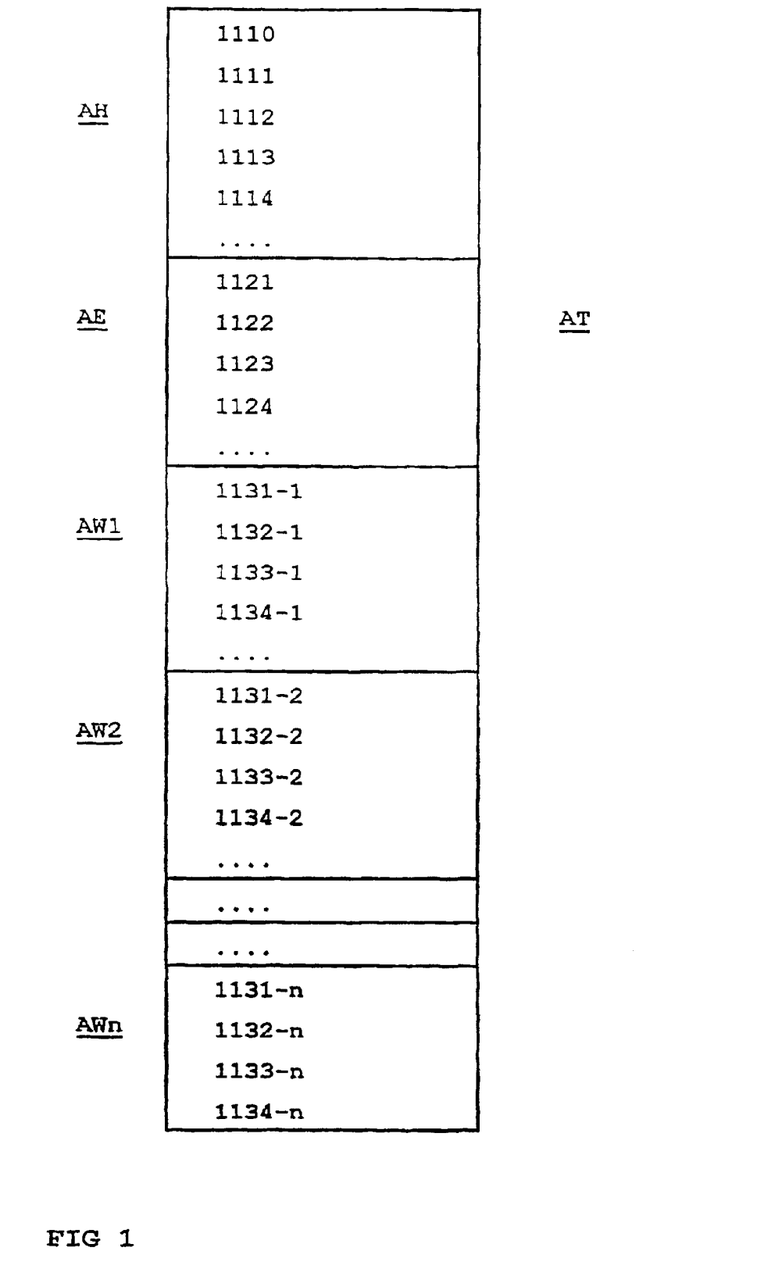
FIG. 1 is an illustration of a request message according to a preferred embodiment of the invention.

According to FIG. 1, the request message AT has at least a header segment AH, an entry data set segment AE, and one or several watch point segments AW1, AW2, . . . , AWn. The header segment AH contains: (a) the job identification 1110; (b) a coding of module 1111 coded by type and number, to which the request message refers; (c) a trigger condition 1112; (d) an identifier regarding possible multiple executions 1113; and (e) the number of watch points without entry data set 1114.

The entry data set AE, which in contrast to the watch points shows the corresponding monitoring values, particularly the registers, prior to execution of the instruction, comprises: (a) a code address 1121; (b) register 1122; (c) an identifier with respect to the number of the subsequent data addresses 1123; and (d) the number of data addresses 1124 defined by the identifier 1123.

The structure of the watch point segments AW1, AW2, . . . , AWn is analogous to that of the entry data set AE. Each of these watch point segments AW1, AW2, . . . , AWn comprises a code address 1131-1, 1131-2, 1131-n ("-1" references the first watch point segment AW1, "-2" correspondingly references the second watch point segment and "-n" the watch point segment AWn. In addition to the code address, every watch point segment contains: (a) data on the relevant register 1132; (b) an identifier with respect to the number of the subsequent data addresses 1133; and (c) the number of data addresses 1134 specified according to the identifier 1133.

Figure 2:
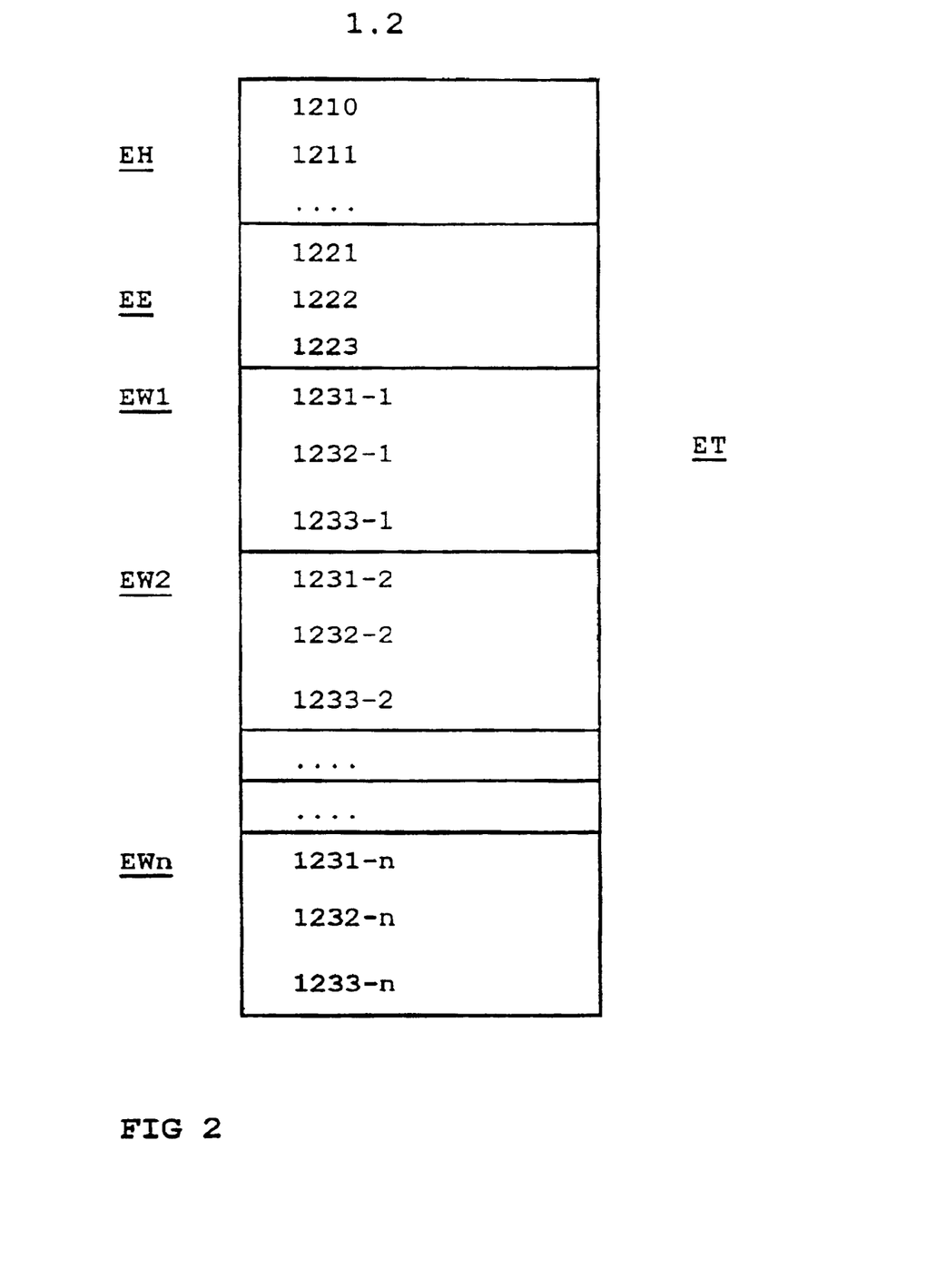
FIG. 2 is an illustration of a receive message according to a preferred embodiment of the invention.

In accordance with FIG. 2, the receive message ET comprises at least the header EH, entry data EE, and watch point data EW1, EW2, . . . , EWn. Specifically, the header EH comprises at least a job identifier 1210 and a job number 1211. The entry data comprises at least the code address 1221, register values 1222, and data values 1223. The watch point data EW1, EW2, . . . , EWn analogously comprise at least the code address 1231, register values 1232, and data values 1233.

The job number 1211 is used to distinguish jobs that are present simultaneously. A unique job number 1211 is automatically assigned by the automation device when the job is allocated. The size of the segments of the receive message ET provided for the register values, 1222, 1232-1, 1232-2, . . . , 1232-n depends on the type and number of the requested registers. Analogously, the size of the segments of the receive message ET provided for the data values 1233, 1233-1, 1233-2, . . . , 1233-n depends on the type and amount of the requested data.

The receive message ET does not necessarily contain all code addresses of the request message AT, since possible jumps in the execution of the program to be monitored may have caused parts of said program not to be executed and certain code addresses specified in the request message AT not to be reached.

The entry data set EE is always present, but its code address 1221 does not necessarily coincide with the code address of the request 1121, since a jump over this first address may have occurred in the monitored cycle.

Figure 3:
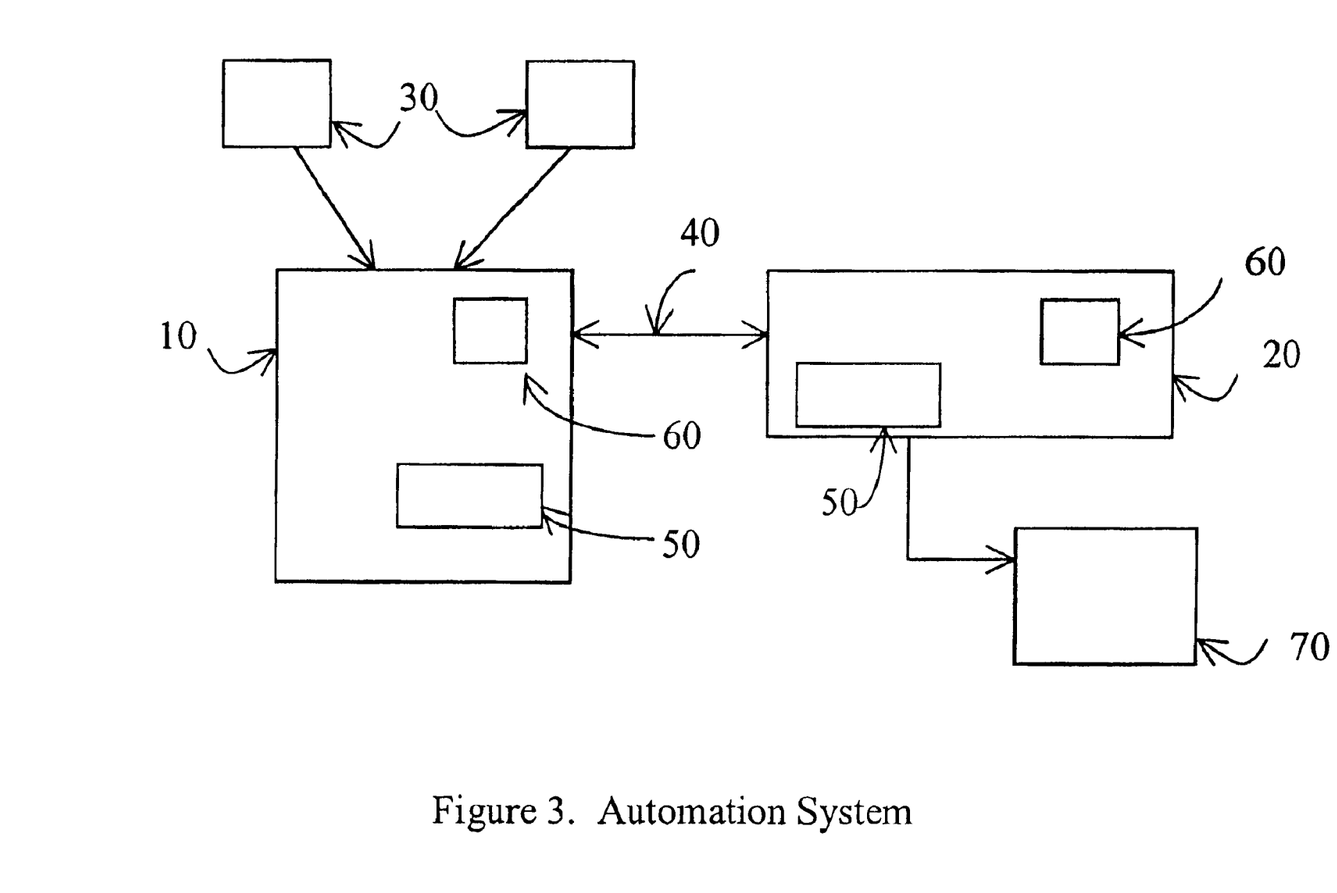
FIG. 3 is an illustration of an embodiment of an automation system according to a preferred embodiment of the invention.

FIG. 3 illustrates the automation system, and the flow of data traffic between the programming device 20 and the automation device 10, which are suitably linked for this purpose by means, for example, of a data transmission cable 40. One of ordinary skill in the art would also recognize that data transmission between the programming device 20 and the automation device 10 can also occur without a physical connection, i.e., transmission and signal technology. As shown in FIG. 3, sensors 30 provide data for monitoring of an external process to the automation device 10. The automation device 10 and programming device 20 can both comprise a monitoring device 60 for displaying process information and messages, etc., as well as a computer readable medium 50 for processing, and storage purposes.

As soon as the user starts monitoring, a request message AT is composed on the side of the programming device 20. This request message AT is transmitted to the automation device 10. The automation device 10 receives the request message AT, accepts it if the structure of the request message AT corresponds to the expected specifications, and assigns a job number 1211. The job is then flagged as blocked.

The automation device 10 sends a positive acknowledgment together with the job number 1211 to the programming device 20. When it receives the positive acknowledgment, the programming device marks the job as accepted.

A release message is then composed on the side of the programming device 20. This release message is transmitted to the automation device 10. On the side of the automation device 10, the job is marked as released upon receipt of the release message.

In response, the automation device 10 sends a positive acknowledgment to the programming device 20. On the side of the programming device 20, the job is marked as released upon receipt of the positive acknowledgment.

If, during execution of the application program in the automation device 10, the trigger condition 1112 specified in the header AH of the request message AT is met at a given instant, the recording of the data, which the user selected for monitoring, begins. In the simplest case, the trigger condition consists of reaching one of the code addresses 1131-1, 1131-2, ..., 1131-n indicated in the request message AT, but more complex trigger conditions are feasible, e.g., "call path" or "open data blocks." If one module out of several other modules is used within a cycle, it is thus possible to monitor any special execution of the code addresses within this cycle. The call path describes a module hierarchy, which is necessary for the recording to begin by the automation device 10. The condition "open data blocks" requires that the indicated data blocks must be open at the start of recording. The conditions may be used alone or in combination.

If, in a simple trigger condition of the aforementioned type, for instance, the code address referenced by address 1131-1 of the reply message AT, is met during execution of the application program, the registers referenced by datum 1132-1, the number of data addresses referenced by datum 1133-1, and notably the data referenced by datum 1134-1 are recorded.

After said recording has been completed, a result message is constructed, which contains at least this recorded data. The corresponding job is blocked and the result is then transmitted to the programming device 20 in the form of a result message ET.

On the side of the programming device 20, the result can now be displayed using the display device 60, or the results can be transmitted to an external device for viewing such as an external monitor or printer 70 for printing hard copies of the data. If the code address referenced by datum 1231-1 is displayed on the monitor 60, the register values 1232-1 and the data values 1233-1 can be displayed in connection with this code address.

After the results have been displayed on the monitor 60, or external device 70, a release message is again sent to the automation device 10 to release the job again. The automation device 10 transmits a positive acknowledgment to the programming device 20 as soon as the job is released. The programming device 20 marks the job as released when it receives said positive acknowledgment. Thus the conditions are restored in such a way that, when the trigger condition is reached next, recording starts again and the recorded data is finally transmitted to the programming device 20 for display. These steps are repeated until the user terminates the job.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A method for operating an automation system comprising the steps of:
   (a) executing an application program in an automation device;
   (b) selecting at least one of a plurality of data addresses to monitor during execution of said application program;
   (c) selecting a code address corresponding to said at least one of a plurality of data addresses selected for monitoring;
   (d) transmitting to the automation device, as part of a request message, the data addresses selected for monitoring and the corresponding code address, wherein the request message comprises a header segment, an entry data set segment, and at least one of a plurality of watch point segments, each of said watch point segments containing at least one code address and one data address;
   (e) recording the content of the data addresses selected for monitoring when the corresponding code address is reached during execution of the application program; and
   (f) transmitting, as part of a result message, the recorded content of the data addresses selected for monitoring.

2. The method according to claim 1, wherein said application program controls and/or monitors an external process.

3. The method according to claim 1, wherein said code address comprises an address of said application program in proximity to a segment of the application program that influences the content of the data addresses selected for monitoring.

4. The method according to claim 1, wherein all memory areas existing in the automation device, including registers, can be referenced using said plurality of data addresses.

5. The method according to claim 1, wherein the data addresses selected for monitoring are recorded by the automation device when the corresponding code address is reached, if a trigger condition is met.

6. The method according to claim 1, wherein the result message has a header segment, an entry data set segment, and at least one of a plurality of watch point segments, each of said watch point segments containing at least one code address and one data address.

7. The method according to claim 1, wherein the data addresses selected for monitoring are recorded by the automation device, and during execution of the application program are transmitted to a programming device at predetermined events.

8. The method according to claim 7, wherein said predetermined events are after each cycle when cyclical application programs are used.

9. The method according to claim 7, wherein in cyclical application programs, the data addresses selected for monitoring are recorded by the automation device and transmitted to the programming device in sections over several cycles.

10. The method according to claim 1, wherein instructions required for monitoring can be masked in the application program.

11. The method according to claim 1, wherein a request job generated by the automation device is blocked upon receipt of the request message in the case of multiple execution of an instruction corresponding to a code defined in the request message.

12. The method according to claim 4, wherein the data addresses selected for monitoring are recorded by the automation device when the corresponding code address is reached, if a trigger condition is met.

13. The method according to claim 1, also comprising the steps of sending an acknowledgement message and a job number from the automation device to a programming device acknowledging receipt of said request message.

14. The method according to claim 1, also comprising the steps of sending a release message from a programming device to said automation device to end monitoring.

15. An automation system comprising:
an automation device;
sensors providing data to said automation device;
a programming device;
a communications program that enables said automation device and said programming device to communicate with one another; and
a computer readable medium for each of said automation device and said programming device, on which is stored a computer program for operating and monitoring said automation system, said computer program of said programming device storing instructions which, when executed, will perform the steps of:
selecting at least one of a plurality of data addresses to monitor during execution of an application program used by said automation device;
selecting a code address corresponding to said at least one of a plurality of data addresses selected for monitoring; and
transmitting to the automation device, as part of a request message, the data addresses selected for monitoring and the corresponding code address, wherein the request message comprises a header segment, an entry data set segment, and at least one of a plurality of watch point segments, each of said watch point segments containing at least one code address and one data address; and
wherein said computer program of said automation device stores instructions which, when executed, will perform the steps of:
executing said application program in said automation device;
recording content of the data addresses selected for monitoring when the corresponding code address is reached during execution of the application program; and
transmitting to the programming device, as part of a result message, the recorded content of the data addresses selected for monitoring.

16. The automation system according to claim 15, wherein said code address comprises an address of said application program in proximity to a segment of the application program that influences the content of the data addresses selected for monitoring.

17. The automation system according to claim 15, wherein all memory areas existing in the automation device, including registers, can be referenced using said plurality of data addresses.

18. The automation system according to claim 15, wherein the data addresses selected for monitoring are recorded by the automation device when the corresponding code address is reached, if a trigger condition is met.

19. The automation system according to claim 15, wherein the result message has a header segment, an entry data set segment, and at least one of a plurality of watch point segments, each of said watch point segments containing at least one code address and one data address.

20. The automation system according to claim 15, wherein the data addresses selected for monitoring are recorded by the automation device, and during execution of the application program are transmitted to the programming device at predetermined events.

21. The automation system according to claim 20, wherein said predetermined events are after each cycle when cyclical application programs are used.

22. The automation system according to claim 20, wherein in cyclical application programs, the data addresses selected for monitoring are recorded by the automation device and transmitted to the programming device in sections over several cycles.

23. The automation system according to claim 15, wherein instructions required for monitoring can be masked in the application program.

24. The automation system according to claim 15, wherein a request job generated by the automation device is blocked upon receipt of the request message in the case of multiple execution of an instruction corresponding to a code defined in the request message.

25. The automation system according to claim 15, wherein the data addresses selected for monitoring are recorded by the automation device when the corresponding code address is reached, if a trigger condition is met.

26. The automation system according to claim 15, also comprising the steps of the sending an acknowledgement message and a job number from the automation device to the programming device acknowledging receipt of said request message.

27. The automation system according to claim 15, also comprising the steps of the sending a release message from a programming device to said automation device to end monitoring.

28. The automation system according to claim 15, also comprising means for displaying or outputting transmitted and recorded data.

29. The automation system according to claim 15, wherein the application program at least one of controls and monitors an external process.

30. A method for operating an automation system comprising the steps of:
(a) executing an application program in an automation device;
(b) selecting at least one of a plurality of data addresses to monitor during execution of said application program;
(c) selecting a code address corresponding to said at least one of a plurality of data addresses selected for monitoring;
(d) transmitting to the automation device, as part of a request message, the data addresses selected for monitoring and the corresponding code address;
(e) recording the content of the data addresses selected for monitoring when the corresponding code address is reached during execution of the application program; and
(f) transmitting, as part of a result message, the recorded content of the data addresses selected for monitoring, wherein the result message has a header segment, an entry data set segment, and at least one of a plurality of watch point segments, each of said watch point segments containing at least one code address and one data address.

31. A method for operating an automation system comprising the steps of:
(a) executing an application program in an automation device;
(b) selecting at least one of a plurality of data addresses to monitor during execution of said application program;
(c) selecting a code address corresponding to said at least one of a plurality of data addresses selected for monitoring;
(d) transmitting to the automation device, as part of a request message, the data addresses selected for monitoring and the corresponding code address;
(e) recording the content of the data addresses selected for monitoring when the corresponding code address is reached during execution of the application program; and
(f) transmitting, as part of a result message, the recorded content of the data addresses selected for monitoring, wherein the data addresses selected for monitoring are recorded by the automation device, and during execution of the application program are transmitted to a programming device at predetermined events, and wherein in cyclical application programs, the data addresses selected for monitoring are recorded by the automation device and transmitted to the programming device in sections over several cycles.

32. A method for operating an automation system comprising the steps of:
(a) executing an application program in an automation device;
(b) selecting at least one of a plurality of data addresses to monitor during execution of said application program;
(c) selecting a code address corresponding to said at least one of a plurality of data addresses selected for monitoring;
(d) transmitting to the automation device, as part of a request message, the data addresses selected for monitoring and the corresponding code address;
(e) recording the content of the data addresses selected for monitoring when the corresponding code address is reached during execution of the application program; and
(f) transmitting, as part of a result message, the recorded content of the data addresses selected for monitoring, wherein a request job generated by the automation device is blocked upon receipt of the request message in the case of multiple execution of an instruction corresponding to a code defined in the request message.

33. An automation system comprising:
an automation device;
sensors providing data to said automation device;
a programming device;
a communications program that enables said automation device and said programming device to communicate with one another; and
a computer readable medium for each of said automation device and said programming device, on which is stored computer program for operating and monitoring said automation system, said computer program of said programming device storing instructions which, when executed, will perform the steps of:
selecting at least one of a plurality of data addresses to monitor during execution of an application program used by said automation device;
selecting a code address corresponding to said at least one of a plurality of data addresses selected for monitoring; and
transmitting to the automation device, as part of a request message, the data addresses selected for monitoring and the corresponding code address; and
wherein said computer program of said automation device stores instructions which, when executed, will perform the steps of:
executing said application program in said automation device;
recording content of the data addresses selected for monitoring when the corresponding code address is reached during execution of the application program; and
transmitting to the programming device, as part of a result message, the recorded content of the data addresses selected for monitoring, wherein the result message has a header segment, an entry data set segment, and at least one of a plurality of watch point segments, each of said watch point segments containing at least one code address and one data address.

34. An automation system comprising:
an automation device;
sensors providing data to said automation device; a programming device;
a communications program that enables said automation device and said programming device to communicate with one another; and
a computer readable medium for each of said automation device and said programming device, on which is stored computer program for operating and monitoring said automation system, said computer program of said programming device storing instructions which, when executed, will perform the steps of:
selecting at least one of a plurality of data addresses to monitor during execution of an application program used by said automation device;
selecting a code address corresponding to said at least one of a plurality of data addresses selected for monitoring; and transmitting to the automation device, as part of a request message, the data addresses selected for monitoring and the corresponding code address; and wherein said computer program of said automation device stores instructions which, when executed, will perform the steps of:

executing said application program in said automation device;

recording content of the data addresses selected for monitoring when the corresponding code address is reached during execution of the application program; and transmitting to the programming device, as part of a result message, the recorded content of the data addresses selected for monitoring, wherein the data addresses selected for monitoring are recorded by the automation device, and during execution of the application program are transmitted to the programming device at predetermined events, and wherein in cyclical application programs, the data addresses selected for monitoring are recorded by the automation device and transmitted to the programming device in sections over several cycles.

35. An automation system comprising:

an automation device;

sensors providing data to said automation device;

a programming device;

a communications program that enables said automation device and said programming device to communicate with one another; and a computer readable medium for each of said automation device and said programming device, on which is stored computer program for operating and monitoring said automation system, said computer program of said programming device storing instructions which, when executed, will perform the steps of:

selecting at least one of a plurality of data addresses to monitor during execution of an application program used by said automation device;

selecting a code address corresponding to said at least one of a plurality of data addresses selected for monitoring; and transmitting to the automation device, as part of a request message, the data addresses selected for monitoring and the corresponding code address; and wherein said computer program of said automation device stores instructions which, when executed, will perform the steps of:

executing said application program in said automation device;

recording content of the data addresses selected for monitoring when the corresponding code address is reached during execution of the application program; and transmitting to the programming device, as part of a result message, the recorded content of the data addresses selected for monitoring, wherein a request job generated by the automation device is blocked upon receipt of the request message in the case of multiple execution of an instruction corresponding to a code defined in the request message.

* * * * *